United States Patent
Raupach et al.

(10) Patent No.: US 10,229,517 B2
(45) Date of Patent: Mar. 12, 2019

(54) METHOD AND APPARATUS FOR AUTOMATED DETERMINATION OF CONTOURS IN ITERATIVE RECONSTRUCTION OF IMAGE DATA

(71) Applicant: Siemens Healthcare GmbH, Erlangen (DE)

(72) Inventors: Rainer Raupach, Heroldsbach (DE); Grzegorz Soza, Heroldsberg (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/388,004

(22) Filed: Dec. 22, 2016

(65) Prior Publication Data
US 2017/0178365 A1    Jun. 22, 2017

(30) Foreign Application Priority Data
Dec. 22, 2015  (DE) ........................ 10 2015 226 400

(51) Int. Cl.
*G06T 11/00*  (2006.01)
*G06T 7/11*  (2017.01)
(Continued)

(52) U.S. Cl.
CPC .......... *G06T 11/003* (2013.01); *G06T 7/0012* (2013.01); *G06T 7/11* (2017.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,835,099 A | * | 11/1998 | Marimont | ............. G06T 11/001 345/591 |
| 2003/0210814 A1 | * | 11/2003 | Nelson | .................. G06T 11/006 382/131 |

(Continued)

FOREIGN PATENT DOCUMENTS

DE   102013206525 A1   10/2014

OTHER PUBLICATIONS

Bengio, et al.: "Greedy layer-wise training of deep networks. Advances in neural information processing systems 19", In MIT Press, pp. 153-160; (2007).

(Continued)

*Primary Examiner* — Tsung-Yin Tsai
(74) *Attorney, Agent, or Firm* — Schiff Hardin LLP

(57) ABSTRACT

In a method and apparatus for segmentation of an examination region to be imaged, scan projection data are acquired from the examination region to be mapped. Iterative reconstruction takes place on the basis of the acquired scan projection data. Preliminary image data and preliminary textural features are reconstructed. Anticipated preliminary structures, preferably preliminary contours, are determined in the examination region on the basis of the obtained preliminary textural features. The anticipated preliminary structures are then taken into account during iterative reconstruction of preliminary image data and preliminary textural features. An image segmentation method is described, moreover. An image reconstruction device is also described.

12 Claims, 4 Drawing Sheets

(51) Int. Cl.
*G06T 7/13* (2017.01)
*G06T 7/00* (2017.01)
*G06T 7/12* (2017.01)
*G06T 7/41* (2017.01)

(52) U.S. Cl.
CPC ............... *G06T 7/12* (2017.01); *G06T 7/13* (2017.01); *G06T 7/41* (2017.01); *G06T 11/006* (2013.01); *G06T 2207/10024* (2013.01); *G06T 2207/10081* (2013.01); *G06T 2207/30056* (2013.01); *G06T 2211/424* (2013.01)

(56) References Cited

U.S. PATENT DOCUMENTS

| | | | | |
|---|---|---|---|---|
| 2004/0037466 | A1* | 2/2004 | Gewaltig | G06T 5/20 382/199 |
| 2007/0053491 | A1* | 3/2007 | Schildkraut | A61N 5/1049 378/65 |
| 2007/0133736 | A1* | 6/2007 | Chen | A61B 6/00 378/5 |
| 2009/0297012 | A1* | 12/2009 | Brett | G06K 9/6209 382/132 |
| 2010/0061601 | A1* | 3/2010 | Abramoff | G06K 9/00617 382/117 |
| 2010/0092093 | A1* | 4/2010 | Akatsuka | G06K 9/6211 382/203 |
| 2010/0329529 | A1 | 12/2010 | Feldman et al. | |
| 2011/0052030 | A1 | 3/2011 | Bruder et al. | |
| 2011/0115787 | A1* | 5/2011 | Kadlec | G01V 1/345 345/419 |
| 2011/0293158 | A1 | 12/2011 | Popescu | |
| 2011/0293159 | A1* | 12/2011 | Bruder | A61B 6/032 382/131 |
| 2011/0293160 | A1* | 12/2011 | Bruder | A61B 6/032 382/131 |
| 2014/0161352 | A1 | 6/2014 | Buyens et al. | |
| 2015/0146948 | A1* | 5/2015 | Huber | G06F 17/3028 382/128 |

OTHER PUBLICATIONS

Zheng, et al.: "Fast Automatic Heart Chamber Segmentation From 3D CT Data Using Marginal Space Learning and Steerable Features"; 21. IEEE 11th International Conference on Computer Vision, eight unnumbered pages; (2007).

Dworzak "3D Reconstruction of the Human Rib Cage from 20 Projection Images Using a Statistical Shape Model"; Diplomarbeit; TU Berlin & Zuse-Institut Berlin; (2009).

Haralick, et al., "Texture features for image classification," IEEE Trans Sys Man Cyb. 3, pp. 610-621, (1973).

Yoon et al., "Simultaneous Segmentation and Reconstruction: A Level Set Method Approach for Limited View Computed Tomography," Med. Phys. 37(5), pp. 2329-2340 (2010).

Haralick et al. "Textural Features for Image Classification," IEEE Trans. on Systems, Man and Cybernetics, vol. SMC-3, No. 6, pp. 610-621 (1973).

* cited by examiner

METHOD AND APPARATUS FOR AUTOMATED DETERMINATION OF CONTOURS IN ITERATIVE RECONSTRUCTION OF IMAGE DATA

BACKGROUND OF THE INVENTION

Field of the Invention

The invention concerns a method for reconstructing image data and textural features of an examination region to be mapped. The invention also concerns a method for segmentation of an examination region to be mapped. The invention also concerns an image reconstruction computer and an image segmentation computer, and a computed tomography system for implementing such methods.

Description of the Prior Art

Segmentation of organs in specified images from medical imaging apparatuses is a crucial step in many clinical applications. For example, segmentation of the liver is a necessary step for determining its volume, or partial volumes thereof. Knowledge of this information can then be used to plan, for example, exact operation steps during a liver operation.

Another example relates to determining contours of organs having a high sensitivity to radiation in order to plan radiotherapy treatment. In this context it is important to identify sensitive, healthy anatomical structures, such as the liver or the bladder, in the body of a patient in order to safeguard these healthy structures against damage due to the exposure to radiation that occurs during radiotherapy. The segmented healthy structures and the segmented tumors to be irradiated are then incorporated in a radiotherapy plan, so an optimum result with respect to the health risk and usefulness of the radiotherapy is attained for the patient.

It is also desirable to develop an automated segmentation method that allows fast and exact processing of extensive quantities of data. Previously, some applications have been automated using modern image processing methods. For example, automated liver or heart segmentation is a component of many clinical applications. However, the existing solutions still have drawbacks and, in order to achieve a correct result, still require an intervention by the user in some of the segmentation processes. There is also a large number of applications in which the segmentation process is performed completely manually by contouring anatomical objects in two dimensions using simple geometric tools, and then combining them to form three-dimensional structures (see, for example, FIG. 1).

A problem in such known procedures that the boundaries between different anatomical objects cannot always be clearly identified and current algorithms are not capable of precisely segmenting objects of this kind. For example, in the case of non-contrasted CT image data, voxels that belong to the liver have the same CT values (Hounsfield values) as the voxels that are associated with adjacent muscle tissue.

To be able to also carry out segmentation on the basis of image data, in which boundaries between different anatomical structures cannot be clearly identified in the image data space, information known in advance about the image data has conventionally been incorporated in the applied segmentation algorithms. One such approach is known as machine learning, when a statistical computer model is generated that includes geometric features and textural features, which is determined on the basis of a large amount of image data. A model of this kind is then applied to a patient's anatomy, with individual items of patient information being taken into account in the recorded image data. An approach of this kind enables image sections in which visual differentiation is not possible to be dealt with better. The model geometry is used in these image sections in order to compensate for deficiencies in image contrast. However, not all segmentation problems have been solved with statistical models of this kind. This is because information missing from the image data cannot be exactly compensated for by statistical information.

During image recording with the use of medical imaging systems, raw data, also called scan projection data, are acquired in a first step. Such data correspond, for example in the case of computed tomography, to the absorption of X-rays as a function of different projection angles. Image data are then reconstructed on the basis of raw data using integration methods. In all conventional segmentation methods, all model approaches are limited to the voxel information of the image data from the image data space. However, a significant portion of information is lost during the transformation from raw data to reconstructed image data and this cannot be recovered using the image data alone.

SUMMARY OF THE INVENTION

An object of the invention is to address these problems by providing a universally applicable, automated reconstruction method that has improved accuracy and reliability when determining anatomical structures, in particular contours of anatomical structures.

In the inventive method for reconstructing image data and textural features of an examination region to be mapped, scan projection data are acquired from the examination region to be mapped. As mentioned, the application of the method in connection with imaging using computed tomography scan data is based on scan values of the absorption of X-rays as a function of different projection angles at which the sets of scan projection data were obtained. An iterative reconstruction is then carried out on the basis of the acquired sets of scan projection data.

Iterative reconstruction is a method for the reconstruction of image data from acquired scan projection data, in particular in computed tomography. Image data with a low noise component can be generated using such reconstruction methods. In this type of reconstruction method, a correction loop is used for the image data reconstruction process, in which loop sectional images of a computed tomography image are calculated in stages by a gradual approaching of the actual density distribution or distribution of attenuation values in a recording region. For this purpose, first an assumption is made about the density distribution of the tissue slices present in the recording region, which are to be examined, and an original image is calculated. From this original image new, synthetic projection data are generated and compared with the actually recorded "genuine" scan projection data, also called raw data. If the data do not match, an appropriate correction image is calculated, which is used to correct the original image. Projection data are then synthesized again and compared with the scanned raw data. This iteration is continued until a defined stop criterion is satisfied. In the corrected image, the spatial image resolution is then increased in contrast-rich regions while the image noise is reduced in lightly contrasted areas. The image is softer in tissue regions with homogeneous density, while contrast-rich tissue boundaries are maintained. Image resolution and image noise are decoupled.

Preliminary image data and preliminary textural features are accordingly inventively obtained during iterative reconstruction. These textural features correspond to individual characteristics of individual points in the projection data space and are at least in part also calculated during iterative reconstruction. The textural features are calculated at the boundaries between two anatomical objects, but also in the other regions within the anatomical objects. In conventional iterative reconstruction this texture information that is no longer present in the definitive image data that result during iterative reconstruction. However, this texture data contain valuable information, such as the probability that a specific point in the space is part of a boundary line between two anatomical objects. According to the invention these textural features are then used for obtaining additional structural information, preferably contour information.

The structural information preferably is contour information, i.e. information regarding the course of boundaries between anatomical structures. The structural information can also be information with respect to structures within organs or, generally, anatomical objects or regions. These structures can be, for example, tumor structures or the like that are to be identified within an organ.

In the inventive method, additional textural features, which are not required for generating the regular image data, can also be calculated on the basis of the raw data in order to improve the quality of structural information, preferably contours, to be obtained. Additional textural features of this kind can relate, for example, to edges or boundary lines between anatomical objects. They can also be related to a characteristic texture within an object. Textural features provide information about the distribution of gray stages in an image recording. An extensive description of these textural features can be found in Haralick et al. "Textural Features for Image Classification", IEEE Transactions on Systems, Man and Cybernetics, Vol. SMC-3, No. 6, November 1973, pp. 610-621, the content of which is incorporated herein by reference.

Anticipated preliminary structures, preferably contours, are accordingly determined in the examination region on the basis of the obtained preliminary textural features. For example, the textural features are information that is correlated with a probability that an edge or contour is present at a specific location in the image. The preliminary structures, preferably contours, in the image data space are then defined on the basis of this information. The anticipated preliminary structures, preferably contours, are then also taken into account during the next iteration step of iterative reconstruction. In other words, they are also incorporated in the generation of synthetic projection data and are then also taken into account in the comparison between the synthetic projection data and the raw data and in the generation of correction image data and analogously also corrected textural features. The anticipated preliminary structures, such as contours, are taken into account in the course of iterative reconstruction during filtering in the raw data space. The anticipated preliminary structures represent separate items of information that, according to the invention, are taken into account during filtering. In this way the structural information and, associated therewith, the textural features, are rendered more precisely in stages. If the determined contour information is combined with the reconstructed image data, an image is obtained having the clearly demarcated image regions associated with the respective anatomical objects.

With the inventive method, the textural features co-generated during reconstruction are advantageously allowed to also be incorporated in the iterative process of image reconstruction and reconstruction of textural features in an automated manner. The textural features represent valuable information with respect to the occurrence of structures, in particular contours, such as boundary lines between organs. In contrast to conventional methods, this information is additionally co-generated during image reconstruction and is incorporated in a subsequent analysis and further processing of the image data, in particular subsequent segmentation of the image data, after the iterative reconstruction. In this way a more precise reconstruction method is achieved which enables a concise presentation of even image regions that do not have strong contrasts in the image data space.

With the inventive method for segmentation of an examination region to be mapped, first the inventive method for reconstructing image data and textural features of an examination region to be mapped is implemented. The examination region to be mapped is then segmented while taking into account textural features determined on the basis of preliminary textural features. The inventive method can also be applied to image regions that cannot be well segmented solely with the use of statistical models. The described steps preferably proceed in an automated manner. Intervention by a user, such as segmentation by marking contours, is not necessary in the inventive method.

Like the iteratively reconstructed image data, the textural features resulting at the end of the iterative reconstruction have a high level of reliability and precision and can contain, for example, very exact details about the probability of the occurrence of boundary lines between anatomical objects. This information is used in automated segmentation to define boundary lines between individual anatomical objects. As an alternative to segmentation, structures or structural regions determined in image data with the use of the textural features can also be extracted. Image regions having specific structures, which are extracted from the image data for more accurate analysis, are determined with the use of the textural features.

The inventive image reconstruction device includes a projection data acquisition scanner for acquiring scan projection data. Part of the inventive image reconstruction computer is also an image data reconstruction processor for carrying out an iterative reconstruction of preliminary image data on the basis of acquired scan projection data. During iterative reconstruction, preliminary textural features are obtained in addition to the preliminary image data. The inventive image reconstruction computer also has a structure-determining processor for determining anticipated preliminary structures in an examination region of an examination object to be mapped on the basis of obtained preliminary textural features.

The inventive image segmentation device has the inventive reconstruction computer. Furthermore, the inventive image segmentation device also has a segmentation processor that is configured to segment the reconstructed image data while taking into account textural features determined on the basis of preliminary textural features. With the use of the inventive image segmentation computer, acquired anatomical images can be segmented in an automated manner, with boundary lines between different anatomical regions, for example organs, being marked in the anatomical images in an automated manner on the basis of structures, preferably contours, determined in an automated manner.

The inventive computed tomography system has an inventive image reconstruction computer. In computed tomography, projection data generated from different angles are reconstructed to form image data. The inventive image reconstruction computer is preferably applied in this type of medical imaging since it uses the iterative reconstruction method frequently used in computed tomography for image reconstruction.

The basic components of the inventive image reconstruction device can be designed for the most part in the form of software components. This relates, in particular, to parts of the image reconstruction computer, such as the image data reconstruction processor and the structure determining processor. These components can also be implemented partly, particularly when fast calculations are involved, in the form of software-assisted hardware, for example FPGAs or the like. The required interfaces, such as the projection data acquisition scanner—for example, when it is merely a matter of acquiring data from other software components—can similarly be designed as software interfaces. However, they can also be designed as interfaces constructed in terms of hardware and which are controlled by appropriate software.

An implementation largely in terms of software has the advantage that even previously used image reconstruction devices can be easily upgraded by way of a software update in order to work inventively. In this respect the object is also achieved by a non-transitory, computer-readable data storage medium encoded with program code that can be loaded directly into memory of an inventive image reconstruction computer. The program code causes the computer to carry out all steps of the inventive method when the program code is run in the image segmentation computer.

The computer-readable medium can be, for example, a memory stick, a hard disk or another transportable or permanently installed data carrier.

In an embodiment of the inventive method for reconstructing image data and textural features of an examination region to be mapped, the anticipated preliminary structures are also determined in the examination region on the basis of reconstructed preliminary image data. In this embodiment, for example, image data as well as textural features can therefore be incorporated in a predetermined weighting in the determination of preliminary contours.

To obtain a reliable basis for a relationship between the textural features and predictable structures, preferably contours, a structure prediction model, for example, can also be used. A structure prediction model of this kind allows the determined textural features to be related to anticipated contours on the basis of general model assumptions.

In a further variant of the inventive method, the steps of iterative reconstruction are repeated until a quality criterion is met for the determined preliminary image data and preliminary textural features. A minimum quality of the determined image data and structure data is therefore guaranteed.

With renewed application of the reconstruction steps, the reconstructed image data and textural features gradually approach a desired level of precision. The quality criterion can comprise, for example, the recognizability of structures, preferably contours, to be determined on the basis of determined image data and textural features the signal-to-noise ratio and the resolution in individual image regions of the image data.

In a preferred embodiment of the inventive method, segmentation of the examination region to be mapped also takes place while taking into account image data determined on the basis of the reconstructed preliminary image data. With this variant, image data, taken into account with a predetermined weighting, are therefore also considered during segmentation in addition to the determined textural features.

During the segmentation step a contour prediction model can be applied, moreover, to define definitive, optimally reliable contours on the basis of the determined textural features and determined image data, which contours are then used for segmentation of the image data or the anatomical images generated on the basis of the image data. A contour prediction model can be, for example, self-organized and generated on the basis of a database and comprise a relationship between the data taken into account during contour formation and the contours themselves.

In further embodiments of the inventive method for reconstructing image data and textural features of an examination region to be mapped, or the inventive method for segmentation of an examination region to be mapped, a structure prediction model is obtained with the use of a training method. First, training scan projection data are acquired in the training method. The training scan projection data can originate, for example, from a database or be acquired directly from an examination object by an imaging method. An iterative reconstruction of preliminary training image data is then carried out on the basis of the training scan projection data. Preliminary training textural features are also determined during iterative reconstruction. Additional structures, preferably contours, are then annotated in the preliminary training image data between individual reconstruction steps. This means boundary lines, for example, are marked in the image data between anatomical structures whose position is known to the marker.

Renewed iterative reconstruction of preliminary training image data and determination of preliminary training textural features then occurs while taking into account the annotated structures, in particular the annotated contours. This means the annotated structures are likewise taken into account when determining synthesized projection data in the course of the iterative reconstruction step, and are therefore also incorporated in the reconstruction of new preliminary training image data and preliminary training textural features. After repeated iteration the most recently reconstructed preliminary training image data and the most recently obtained preliminary training textural features are classified as the definitive training image data and definitive training textural features. The definitive training image data and the definitive training textural features are finally used to generate a structure prediction model.

A structure prediction model of this kind, preferably a contour prediction model, indicates a relationship between reconstructed image data, textural features and structures, in particular contours. With the use of the structure prediction model conclusions can therefore be made on the basis of textural features, for example, about the position of object boundaries or specific structures. This information can in turn be used in the inventive image reconstruction method and the inventive segmentation method to determine local textural features more accurately. For example, in the course of iterative reconstruction, anisotropic filtering along the assumed object boundaries can be carried out in the inventive image reconstruction method in such a way that the edges are contrasted and sharply mapped. Since the relationship between structures, in particular contours, and textural features is not yet known in the training method, the structures, preferably contours, are marked in the training image data by hand. The structures are then transformed with the current preliminary training image data into the projection data space and also taken into account in the next iteration step or the next reconstruction step. In the next reconstruction step new preliminary training image data and new preliminary training textural features are then reconstructed again, and these are already improved as far as the presentation of structures, in particular contours, is concerned. In this way precise training textural features and precise training image data is generated which can then be used to form a structure prediction model.

In another embodiment of the inventive method for reconstructing image data and textural features of an examination region to be mapped or the inventive method for segmentation of an examination region to be mapped, the steps of annotating structures, of renewed iterative reconstruction of preliminary training image data and of determining preliminary training textural features are repeated until a quality criterion is met of the determined preliminary training image data and the determined preliminary training textural features. The quality criterion can include, for example, a contrast or a resolution of the image data and a reliability of the recorded textural features. In this way a required minimum quality of image presentation and of the contours of the acquired image data can be achieved.

In a further embodiment of the inventive method for reconstructing image data and textural features of an examination region to be mapped or the inventive method for segmentation of an examination region to be mapped, a machine learning process is carried out to generate the structure prediction model on the basis of definitive training image data and the definitive training textural features. A machine learning process of this kind is described, for example, in Bengio et al., 2007, "Layer-Wise Training of Deep Networks", Advances in Neural Information Processing Systems. As an alternative to the machine learning process, a learning process called a "deep learning approach" (see Zheng et al, 2007, "Fast Automatic Heart Chamber Segmentation from 3D CT Data using Marginal Space Learning and Steerable Features", In Proc. Intl. Conf. Computer Vision) can also be used. The structure prediction model can be determined in a self-organized manner on the basis of a statistic, i.e. a large amount of present training data. In other words, no rigid model structure is specified for the relationship between individual variables. Instead the model structure results only on the basis of the used training data and therefore allows flexible adjustment to the respective field of use.

In a specific variant of the inventive method for reconstructing image data and textural features of an examination region to be mapped or the inventive method for segmentation of an examination region to be mapped, the textural features comprise "edge maps", which are also called "edge images", and are present in the image data space. These edge images combine for each voxel of one or more textural feature(s) which have been determined in the iterative reconstruction process. They differ from conventional image data and can be considered more as contour images. For example, an edge image can comprise just the pure contours of an image. In a more complex embodiment an edge image of this kind can also comprise the contours combined with the reconstructed image data.

An edge image is calculated from a digital image by what is known as edge detection by analyzing adjacent image elements for changes in their color or gray-scale values. As a result striking color and brightness transitions are marked in white. All other image regions are black. The contour information contained in the edge images can be used in the inventive method for determining contours in the image data generated during iterative reconstruction.

In another embodiment of the inventive method for reconstructing image data and textural features of an examination region to be mapped or the inventive method for segmentation of an examination region to be mapped, the textural features have textural feature vectors. What are known as textural feature vectors are multi-dimensional vectors which each relate to a point in the reconstruction space, i.e. the image data space, and whose components comprise textural features.

The edge images as well as the textural feature vectors can be used in the course of the training method by one of said learning algorithms to generate a structure prediction model, in particular a contour prediction model. In a learning process of this kind manually generated reference segmentations, which have been performed by experienced radiologists, are applied to the training image data to learn the connection between textural features and contours of organ boundaries and internal and external regions. In other words, a relationship is determined between the textural features associated with the training image data and the contours annotated in the training process.

In another embodiment of the inventive image segmentation device the structure-determining unit, preferably a contour-determining unit, is adapted to apply a preferably trained contour prediction model when determining anticipated preliminary contours in an examination region of an examination object to be mapped, in addition to the preliminary textural features. As already mentioned, a contour prediction model allows reliable determination of contours on the basis of reconstructed image data and textural features.

The inventive image segmentation system has a contour prediction model training processor for generating a trained contour prediction model. A contour prediction model training processor of this kind enables training of a contour prediction model with the inventive image segmentation computer, so no additional devices are required for the described training process. As already mentioned, the inventive image segmentation computer can also be implemented at least partially as a software solution. The inventive image segmentation computer can accordingly also be easily empowered with the aid of additional software programs to support the described training processes.

DESCRIPTION OF THE PREFERRED EMBODIMENTS

Figure 1:
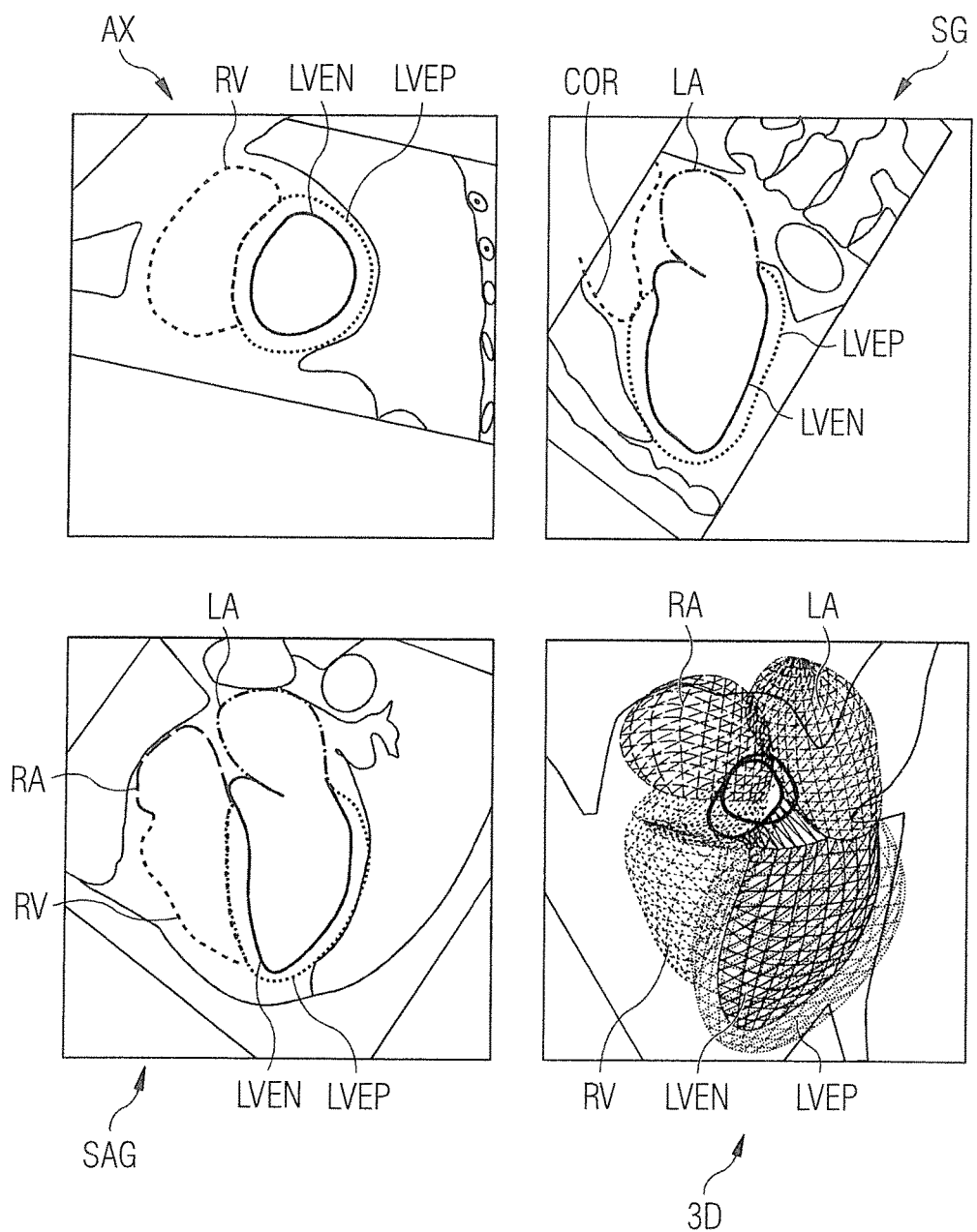
FIG. 1 shows an exemplary illustration of a segmentation of a human heart.

FIG. 1 shows a segmentation of a human heart in order to illustrate the procedure conventional in segmentation in four partial images. The illustration is composed of three two-dimensional image recordings or sectional images in which partial organ boundaries between part organs of the heart are marked. A fourth partial image comprises a three-dimensional segmented illustration of the heart. A first partial image is recorded in an axial plane AX. The first partial image shows two-dimensional contours of a right heart chamber RV (also called the right ventricle), an inner wall LVEN of a left ventricle and an outer wall LVEP of the left ventricle. A second partial image is recorded in a cordial plane COR. Contours of the left atrium LA are marked in the second partial image in addition to the contours of the right ventricle RV, the inner wall LVEN of the left ventricle and the outer wall LVEP of the left ventricle. A third partial image is recorded in a sagittal plane SAG. Contours of the right atrium RA are also marked in the third partial image in addition to the contours of the right ventricle RV, the inner wall LVEN of the left ventricle and the outer wall LVEP of the left ventricle and the contours of the left atrium LA. The fourth partial image 3D shows the contours or limits of all part organs already identified by contours in the two-dimensional images, i.e. in particular the contours of the right ventricle RV, the inner wall LVEN of the left ventricle, the outer wall LVEP of the left ventricle, the left atrium LA and the right atrium RA, as surface networks in the three-dimensional space. Therapy planning, for example planning a heart operation, can be carried out with the use of the fourth partial image, with the boundaries of individual part organs being known with the aid of the fourth partial image and therefore, for example, the position and length of scalpel cuts can be determined extremely accurately in advance.

Figure 2:
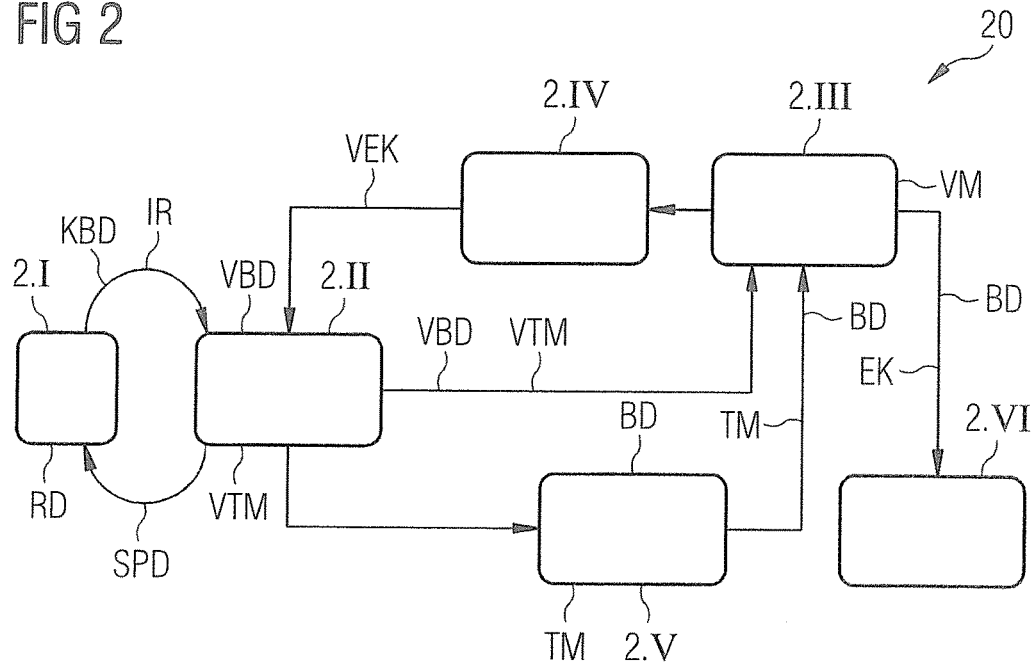
FIG. 2 is a block diagram illustrating a method for determining contour data according to an exemplary embodiment of the invention.

FIG. 2 shows a schematic diagram 20 that illustrates a method for segmentation an examination region to be mapped according to one exemplary embodiment of the invention. In the method shown in FIG. 2 an individual image data set BD is segmented using a prediction model VM which has been generated, for example, according to the method illustrated in FIG. 3.

In step 2.I first raw data RD, also called scan projection data, are acquired from an examination region FOV to be mapped. This can occur, for example, with the aid of a computer tomographic image recording. The acquired raw data are then subjected in step 2.II to a first reconstruction step which is a component of an iterative reconstruction process IR. In the first reconstruction step preliminary textural features VTM, for example in the form of multi-dimensional textural feature vectors, are also determined in addition to preliminary image data VBD. In step 2.III probabilities or probability values are then determined for contours present in the preliminary image data VBD on the basis of a prediction model VM and the preliminary textural features VTM. This means the probability values provide information about which contours can be anticipated at which location as a function of the preliminary textural features VTM and the preliminary image data. In step 2.IV preliminary contours VEK to be anticipated are then defined in the preliminary image data VBD on the basis of the determined probabilities. The method then returns to step 2.II and a renewed reconstruction step is carried out on the basis of the preliminary image data VBD, the preliminary textural features VTM and the preliminary anticipated contours VEK. As already mentioned in the introduction, with a reconstruction step of this kind synthesized projection data SPD are determined, which are then compared with the acquired raw data RD. On the basis of this comparison correction image data KBD are then generated that are used to correct the previously reconstructed preliminary image data VBD. In the reconstruction step the determined preliminary anticipated contours VEK are also taken into account, for example in a filtering process. A "smoothing", for example, occurs only in the longitudinal direction of preliminary edges and boundary lines and not transversely thereto. If the corrected preliminary image data VBD generated during the reconstruction meets a predetermined quality criterion, such as visibility of contours, then the method passes to step 2.V in which the most recently determined preliminary image data VBD and the most recently determined preliminary textural features VTM are classified as the definitive image data BD and the definitive textural features TM. The method then returns to step 2.III, with definitive contours EK being determined on the basis of definitive image data BD and the definitive textural features TM and using the prediction model VM. Finally, in step 2.VI the reconstructed image data BD are segmented using the determined definitive contours EK on the definitive image data BD. This means the image data BD are segmented along the determined contours EK. In particular object boundaries, which have been generated on the basis of image data BD, are marked on images thereby.

Figure 3:
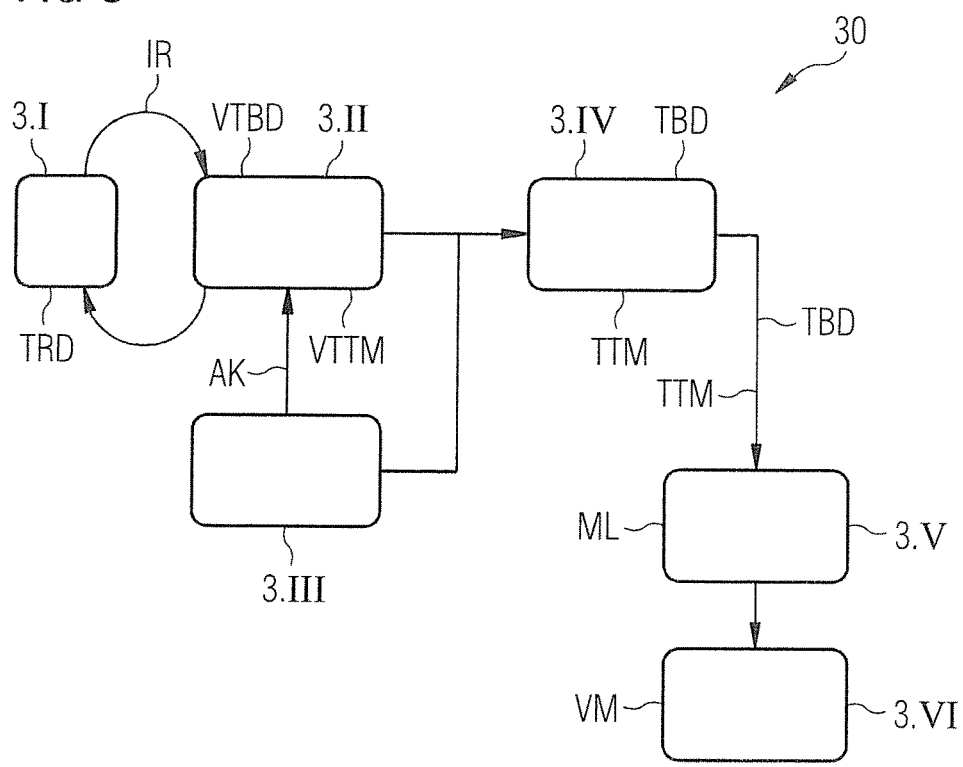
FIG. 3 is a block diagram illustrating the generation of a contour prediction model with the use of a training method.

FIG. 3 is a block diagram that illustrates the generation of a prediction model with the aid of a training method. A prediction model is to be generated in the training phase using a machine learning process. First, training scan projection data TRD are acquired in step 3.I. The training scan projection data TRD can, for example, be taken from a database or have been generated directly by an image recording of a patient. In step 3.II a first reconstruction step is then performed in the course of an iterative reconstruction IR of preliminary training image data VTBD on the basis of training scan projection data TRD. Preliminary training textural features VTTM are also determined in addition to the preliminary training image data VTBD. In this stage the preliminary training image data VTBD as well as the preliminary training textural features VTTM are still imprecise. To make contours clearer in the preliminary training image data VTTM object boundaries are then recorded or annotated as contours AK, for example by hand, in the training image data VTBD in step 3.III. To be able to take the annotated contour data AK into account in the next reconstruction step, this is transformed back from the image data space into the raw data space.

The method then returns to step 3.II, wherein, however, the next reconstruction step is then carried out while taking into account the annotated contour data AK. For example, anisotropic filtering along the marked contours AK is carried out during reconstruction such that edges in the image data are not imprecise but more enhanced. This means a filter algorithm applied during iterative reconstruction takes into account the annotated contours AK. The preliminary training image data VTBD generated again in the step 3.II, and associated training textural features VTTM, are then already much more precise than in the case of the first pass since the annotated contour information AK has been taken into account during their reconstruction.

In a renewed step 3.III object boundaries can then in turn be marked as annotated contour data AK in the obtained preliminary training image data VTBD. This can then also be incorporated in a further reconstruction step 3.II in the manner already described in the reconstruction of preliminary training image data VTBD and associated training textural features VTTM. Once a desired image quality has been reached in which the object boundaries are sufficiently visible, the most recently reconstructed preliminary training image data VTBD and the most recently obtained preliminary training textural features VTTM are classified as definitive training image data ETBD and definitive training textural features ETTM in step 3.IV.

In step 3.V a specific training process ML is then carried out, with the reconstructed image data TBD and textural features TTM being compared manually with reference segmentations marked in image data by experts. If an appropriate number of training image data sets TBD and reference segmentations is taken into account, a statistic can be determined based on which specific textural features are associated with, for example, organ boundaries, inner regions of organs, and regions outside of the organs. A machine learning process, for example, can be used for the training process in the course of step 3.V. The statistical relationship determined in step 3.V between the textural features and the organ boundaries or contours is used in step 3.VI to generate a prediction model VM which can make a prediction regarding the position of the object boundaries or contours present in the examination region for image data from a desired examination region and possibly known textural features.

Figure 4:
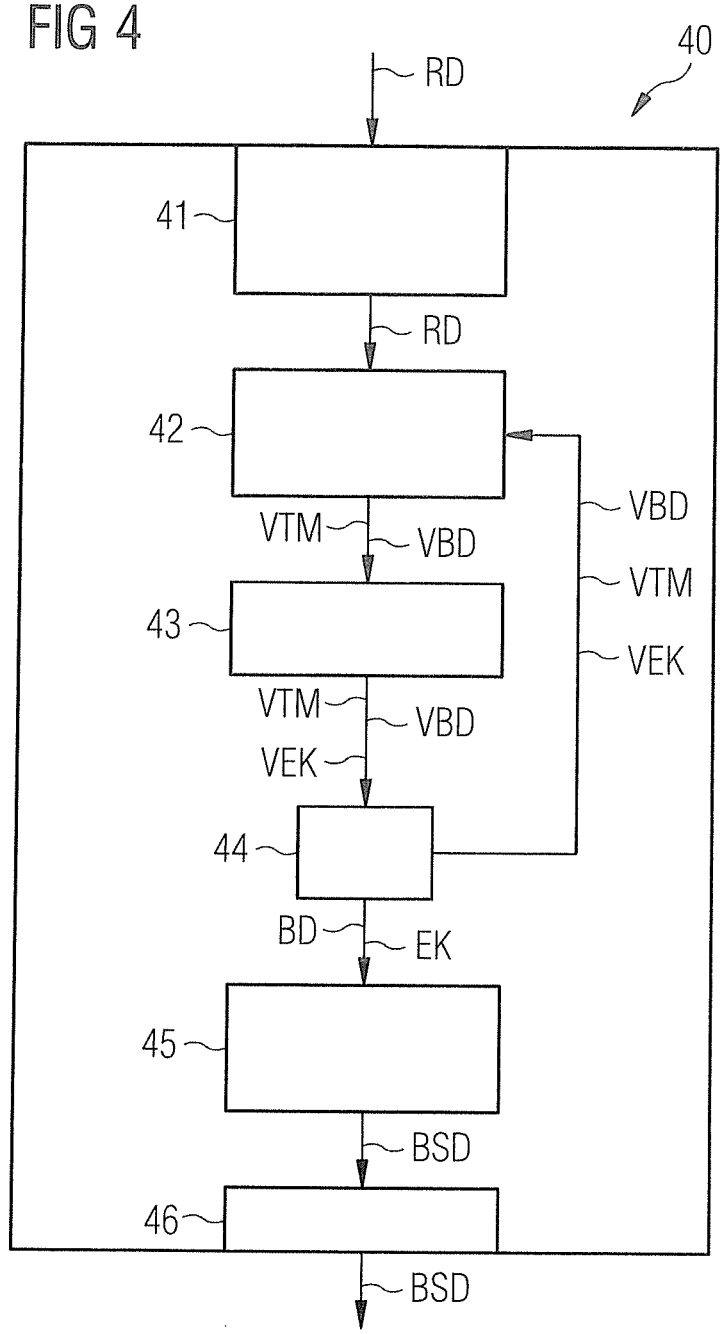
FIG. 4 is a schematic illustration of an image segmentation device according to an exemplary embodiment of the invention.

FIG. 4 shows an image segmentation computer 40 according to one exemplary embodiment of the invention. The image segmentation computer 40 has a projection data acquisition processor 41 for acquiring scan projection data RD, which has been recorded, for example, in the course of a CT imaging method from an examination region FOV. The acquired raw data RD are forwarded to an image data reconstruction processor 42 that reconstructs preliminary image data VBD on the basis of acquired raw data RD in the course of a first step of iterative reconstruction. In the reconstruction step, preliminary textural features VTM are obtained in addition to the preliminary image data VBD. The preliminary image data VBD and the preliminary textural features VTM are then transferred to a contour-determining unit 43 which determines anticipated preliminary contours VEK in the examination region FOV to be mapped on the basis of obtained preliminary textural features VTM. The determined data VTM, VEK, VBD are then transferred to a quality control processor 44, which checks on the basis of the determined data whether the preliminary image data VBD has already reached a predetermined quality and the preliminary contours VEK have a specified minimum reliability. If this is not yet the case, a further iterative image data reconstruction step is carried out by the image data reconstruction processor 42 while taking into account the determined preliminary contours VEK and the determined preliminary image data VBD. Preliminary image data VBD and preliminary textural features VTM are generated again in the process.

The reconstructed data VBD, VTM are then in turn used by the contour-determining unit 43 to determine adjusted contour data VEK. Should the quality control unit 44 then find on the basis of newly determined data VBD, VTM, VEK that the quality criteria are met, the determined preliminary image data VBD and preliminary contour data VEK are classified as definitive image data BD and definitive contour data EK and are forwarded to a segmentation processor 45. The segmentation processor 45 uses the determined contour data EK to segment the reconstructed image data BD. Organ boundaries, for example, are identified and marked in the image data. The image segment data BSD generated in the process can then be output via an output interface 46 at a database or, for example, at a screen unit for further processing and analysis.

Figure 5:
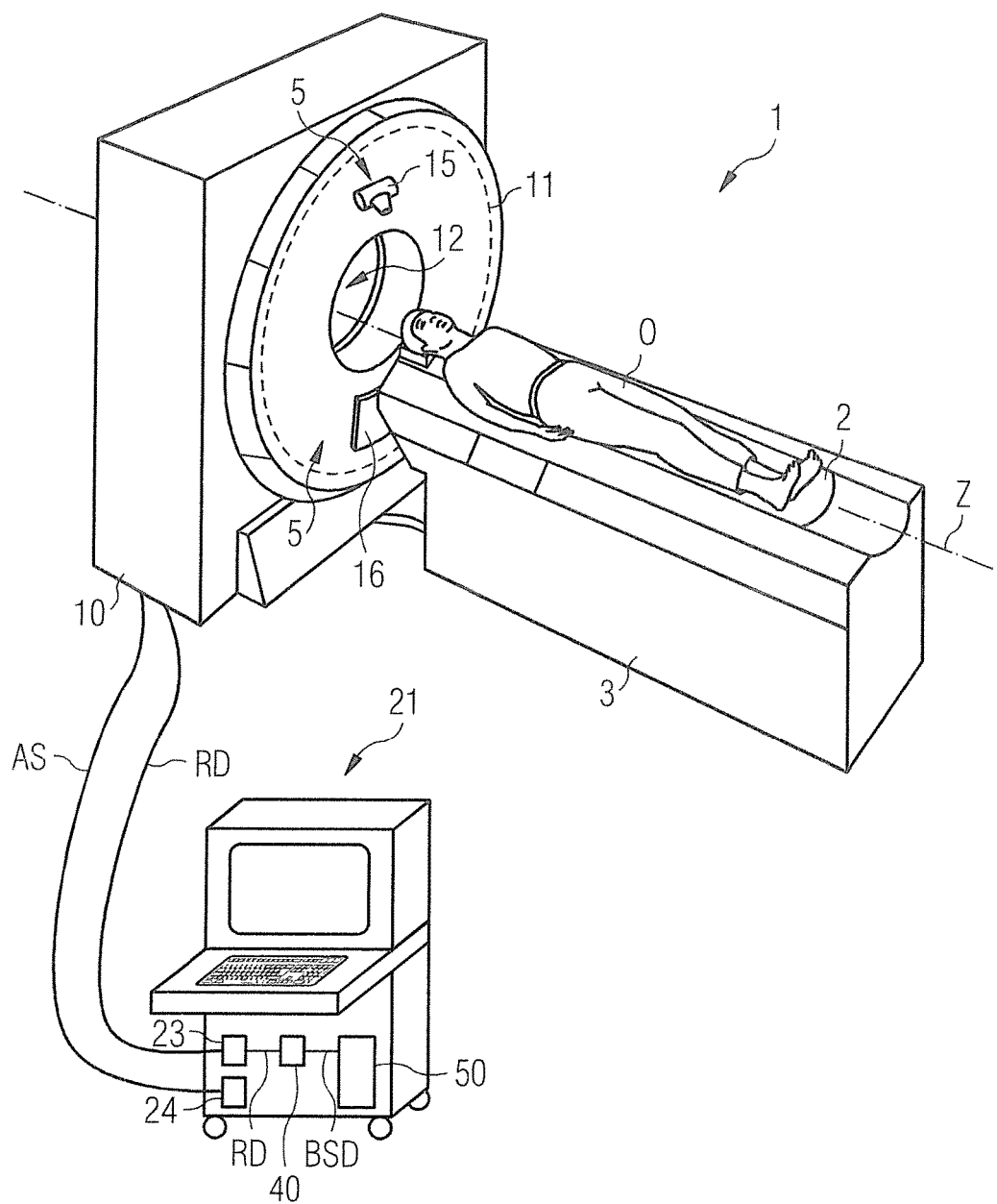
FIG. 5 schematically illustrates a computed tomography system according to an exemplary embodiment of the invention.

FIG. 5 schematically illustrates a computed tomography system (CT system) 1 having an inventive image segmentation device 40 according to one exemplary embodiment of the invention.

The CT system 1 essentially has a scanner 10 in which a projection data acquisition unit 5 having a detector 16 and an X-ray source 15 opposing the detector 16 rotates on a gantry 11 around a scan space 12. In front of the scanner 10 is located a patient-positioning device 3 or an examination table 3 whose upper part 2 can be pushed with a patient O located thereon toward the scanner 10 in order to move the patient O through the scan space 12 relative to the detector system 16. The scanner 10 and examination table 3 are controlled by a controller 21, from which acquisition control signals AS issue via a conventional control interface 24 to conventionally control the entire system according to specified scan protocols. The movement of the patient O in the z direction, which corresponds to the system axis z longitudinally through the scan space 12, and the simultaneous rotation of the X-ray source 15 produce a helix path for the X-ray source 15 relative to the patient O during the scan. At the same time the detector 16 runs along as well, always opposite the X-ray source 15, to acquire projection scan data RD, which are then used for the reconstruction of volume and/or slice image data. A sequential scanning method can be carried out as well in which a fixed position is approached in the z direction and then during a rotation, a partial rotation or a number of rotations, the required projection scan data RD is acquired at the relevant z position in order to reconstruct a sectional image at this z position or to reconstruct volume image data from the projection data of a plurality of z positions. The inventive method can basically also be used on other CT systems, for example with a detector that forms a complete ring.

The scan projection data RD (also called raw data below) acquired by the detector 16 from an examination region FOV are passed via a raw data interface 23 to the controller 21. This raw data are then processed further in an image segmentation computer 40, which in this exemplary embodiment is implemented in the form of software in a processor in the controller 21. This image segmentation computer 40 carries out image segmentation in the manner described in connection with FIG. 2 on the basis of acquired raw data RD.

The segmented image data BSD are then forwarded to a storage device 50. From there the image information BSD can be graphically displayed, for example on a screen, or can be forwarded to external analysis devices or therapy planning devices (not shown).

The described methods and the devices are only preferred exemplary embodiments of the invention, and the invention can be varied by those skilled in the art without departing from the scope of the invention. The method, image reconstruction device and image segmentation device have primarily been illustrated using a system for recording medical image data. However, the invention is not limited to an application in the medical sector but can basically also be applied to the reconstruction and segmentation of images for other purposes. Furthermore, the inventive method has been illustrated in connection with the reconstruction and segmentation of CT images. However, the invention is not limited to the reconstruction and segmentation of CT images but can also be applied to other imaging methods. For the sake of completeness reference is made to the fact that use of the indefinite article "a" or "an" does not preclude the relevant features from also being present multiple times. Similarly, the term "unit" does not preclude this from comprising a plurality of components which may optionally also be spatially distributed.

The invention claimed is:

1. A method for reconstructing image data and textural features of an examination region to be mapped, comprising:
   providing scan projection data to a processor, acquired from the examination region to be mapped;

in said processor, implementing an iterative reconstruction procedure on the acquired scan projection data in order to produce a reconstructed image of the examination region at an end of said iterative reconstruction procedure;

in said iterative reconstruction procedure in said processor, reconstructing preliminary image data and preliminary textural features, determining anticipated preliminary structures in the examination region based on said preliminary textural features, and thereafter iteratively reconstructing said reconstructed image dependent on the anticipated preliminary structures and the preliminary textural features; and making the reconstructed image available from the processor as an electronic output comprising a data file.

2. A method as claimed in claim 1 comprising determining said anticipated preliminary features in the examination region based on at least one of reconstructed preliminary image data and a structure prediction model.

3. A method as claimed in claim 1 wherein said iterative reconstruction comprises a plurality of iterative steps, and repeating said iterative steps until a quality criterion is satisfied for said preliminary image data and said preliminary textural features.

4. A method as claimed in claim 1 comprising determining said anticipated preliminary structure based on a structure prediction model, and generating said structure prediction model by:

providing training scan projection data to the processor, in said processor, implementing an iterative reconstruction of preliminary training image data based on said training scan projection data, and determining preliminary training textural features during the iterative reconstruction of said preliminary training image data;

in said processor, annotating structures in said preliminary training image data;

in said processor, implementing a renewed iterative reconstruction of new preliminary training image data and determining preliminary training textural features dependent on the annotated structures;

in said processor, classifying most recently reconstructed preliminary training image data and most recently obtained preliminary training textural features, as definitive training image data and definitive training textural features; and using the definitive training image data and the definitive training textural features to generate said structure prediction model.

5. A method as claimed in claim 4 comprising repeating annotation of said structures and renewed iterative reconstruction of said preliminary training image data and renewed determining of said preliminary training textural features, until a quality criterion is satisfied for at least one of the determined preliminary training image data and the determined preliminary training textural features.

6. A method as claimed in claim 4 comprising determining said structure prediction model using a procedure selected from the group consisting of a machine learning procedure and a deep-learning procedure, based on the definitive training image data and the definitive training textural features.

7. A method as claimed in claim 1 wherein said textural features comprise edge images.

8. A method as claimed in claim 1 wherein said textural features comprise textural feature vectors.

9. A method as claimed in claim 1 wherein said textural features are contours.

10. An image reconstruction apparatus and textural features of an examination region to be mapped, comprising:

a processor provided with scan projection data acquired from the examination region to be mapped;

said processor being configured to implement an iterative reconstruction procedure on the acquired scan projection data in order to produce a reconstructed image of the examination region at an end of said iterative reconstruction procedure;

in said iterative reconstruction procedure, said processor being configured to reconstruct preliminary image data and preliminary textural features, determine anticipated preliminary structures in the examination region based on said preliminary textural features, and thereafter iteratively reconstruct said reconstructed image dependent on the anticipated preliminary structures and the preliminary textural features; and being configured to make the reconstructed image available from the processor as an electronic output comprising a data file.

11. A computed tomography apparatus comprising:

a computed tomography scan projection data acquisition scanner that acquires projection scan data from an examination region to be mapped;

a processor provided with said scan projection data;

said processor being configured to implement an iterative reconstruction procedure on the acquired scan projection data in order to produce a reconstructed image of the examination region at an end of said iterative reconstruction procedure;

in said iterative reconstruction procedure, said processor being configured to reconstruct preliminary image data and preliminary textural features, determine anticipated preliminary structures in the examination region based on said preliminary textural features, and thereafter iteratively reconstruct said reconstructed image dependent on the anticipated preliminary structures and the preliminary textural features; and being configured to make the reconstructed image available from the processor as an electronic output comprising a data file.

12. A non-transitory, computer-readable data storage medium encoded with programming instructions, said storage medium being loaded into a computer and said programming instructions causing said computer to:

receive scan projection data acquired from an examination region to be mapped;

implement an iterative reconstruction procedure on the acquired scan projection data in order to produce a reconstructed image of the examination region at an end of said iterative reconstruction procedure;

in said iterative reconstruction procedure, reconstruct preliminary image data and preliminary textural features, determine anticipated preliminary structures in the examination region based on said preliminary textural features, and thereafter iteratively reconstruct said reconstructed image dependent on the anticipated preliminary structures and the preliminary textural features; and make the reconstructed image available from the processor as an electronic output comprising a data file.

* * * * *